Dec. 9, 1924.

L. N. SNOW

EGG TURNER

Filed Sept. 22, 1924

1,519,068

Inventor
Lyle N. Snow
By Vernon E. Hodges
His Attorney

Patented Dec. 9, 1924.

1,519,068

UNITED STATES PATENT OFFICE.

LYLE N. SNOW, OF QUINCY, ILLINOIS, ASSIGNOR TO H. M. SHEER COMPANY, OF QUINCY, ILLINOIS, A CORPORATION OF ILLINOIS.

EGG TURNER.

Application filed September 22, 1924. Serial No. 739,123.

*To all whom it may concern:*

Be it known that I, LYLE N. SNOW, a citizen of the United States, residing at Quincy, in the county of Adams and State of Illinois, have invented certain new and useful Improvements in Egg Turners, of which the following is a specification.

This invention relates to an improvement in egg-turners.

The object is to provide simple, light, inexpensive and effectual mechanism for turning eggs.

The present invention consists of a frame having a cross-bar and brace beneath its center, a plurality of rollers journaled in the frame and above the brace, a lever pivoted to the brace, and a flexible device rove around the rollers and connected to the lever for simultaneously and correspondingly turning the rollers and with them the eggs resting thereon, with the swinging of the lever.

In the accompanying drawings:—

Figure 1:
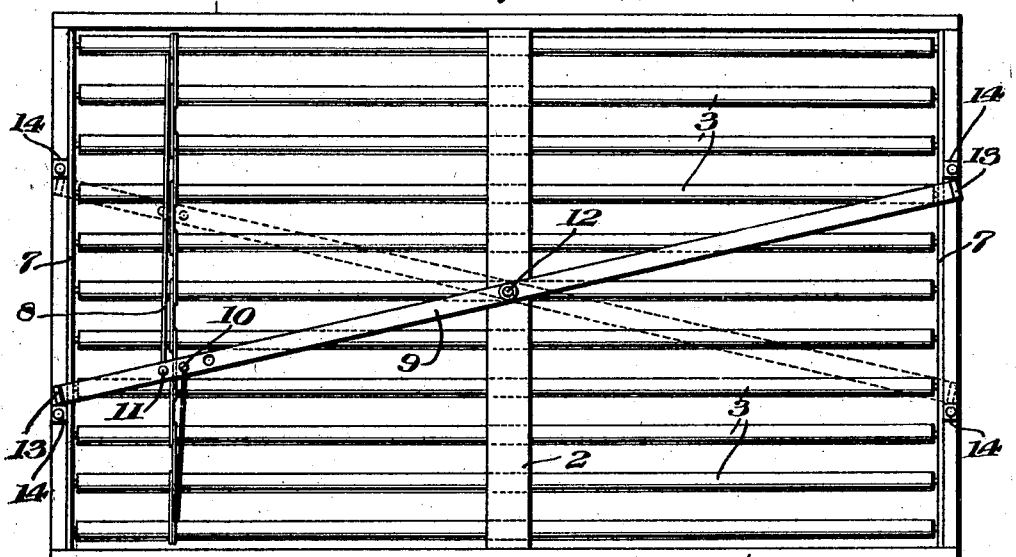
Fig. 1 is a bottom plan view.
Figure 2:
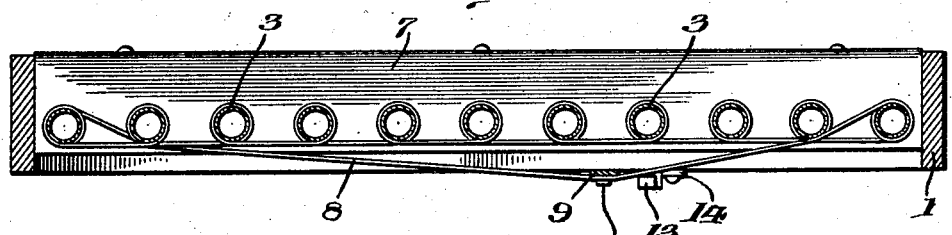
Fig. 2 is a section on the line 2—2 of Fig. 1 looking in the direction of the arrows.
Figure 3:
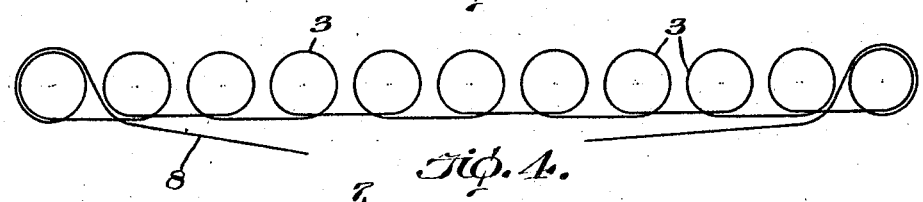
Fig. 3 is a diagrammatic view.

The numeral 1 represents the frame; and 2 is a cross-bar or brace extending across preferably centrally from side to side of the frame, to the inner sides of which its ends are secured as shown in Figs. 1 and 2.

Figure 4:
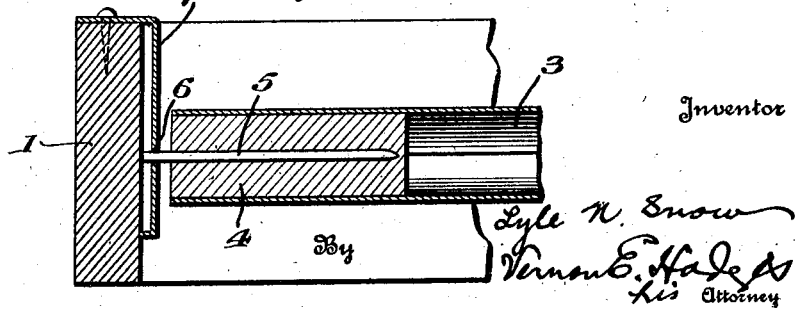
Fig. 4 is an enlarged vertical sectional view through one end of the frame, including one of the rollers.

Rollers 3, of which there are several, preferably extending parallel with one another, are journaled at their ends at the opposite ends of the frame, as shown in Figs. 1 and 4. These rollers are preferably in the form of sheet-metal tubes, in order to make them cheap and light, and they may have wooden plugs in the ends as viewed in Fig. 4, and the pins 5 extending into these plugs forming trunnions which turn in the holes 6 formed in the sheet-metal plates 7 at the ends of the frame.

A flexible device 8, preferably in the form of a cord, is rove around the rollers, preferably somewhat as illustrated in the drawings, and its ends 10, 11, are secured to the lever 9. This lever 9 is pivoted at or near its center to the cross-bar 2 by means of a pin or bolt 12, and the opposite ends 13 extend out at the opposite ends of the frame 1.

Stops 14 are placed in position to limit the amount of the lever, and these stops are intended to be so placed as to define and limit the rotation of the rollers to approximate the exact turn-over of the eggs thereon.

In this way, a very simple, light, and inexpensive tray is provided for manipulating these eggs.

Claims:—

1. An egg-turner including a frame, rollers journaled therein, an endless device rove around the rollers, a cross-bar-brace, a lever pivoted thereto and to which the endless device is connected, at least one end of the lever extending to the end of the frame within easy reach of the operator, it being adapted when moved to the right or left to transmit motion to the several rollers through the flexible connection.

2. An egg-turner including a frame, rollers journaled therein, an endless device rove around the rollers, a cross-bar-brace, a lever pivoted thereto and to which the endless device is connected, at least one end of the lever extending to the end of the frame within easy reach of the operator, it being adapted when moved to the right or left to transmit motion to the several rollers through the flexible connection, and stops for defining and limiting the movement of the lever in order to impart a predetermined turn to the rollers.

3. The combination with a frame having a cross-bar-brace, rollers journaled therein, of a lever pivoted at or near its center to the cross-bar with its ends extending to the ends of the frame, and a flexible connection rove around the rollers and having its ends connected to the lever, whereby the swing of the lever from either end of the frame transmits its movement through the flexible connection to the several rollers and simultaneously turns them.

4. The combination with a frame having a cross-bar-brace, rollers journaled therein, of a lever pivoted at or near its center to the cross-bar with its ends extending to the ends of the frame, a flexible connection rove around the rollers and having its ends connected to the lever, whereby the swing of the lever from either end of the frame transmits its movement through the flexible connection to the several rollers and simultaneously turns them, and stops placed in position to limit the movement of the lever.

In testimony whereof I affix my signature.

LYLE N. SNOW.